Oct. 21, 1941.  P. M. E. DESHAYES  2,260,008
RECEPTACLE FOR TRANSPORTING AND DELIVERING LIQUIDS
Filed May 11, 1939
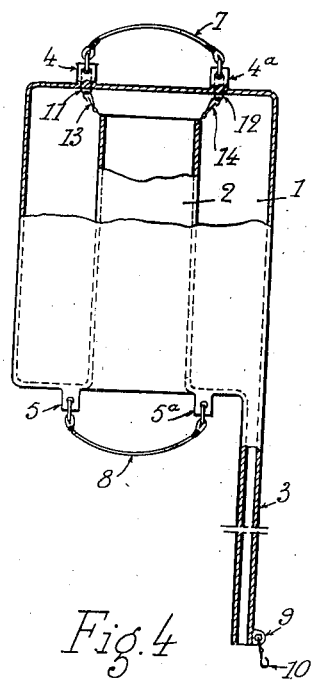
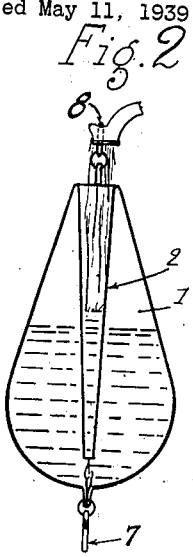
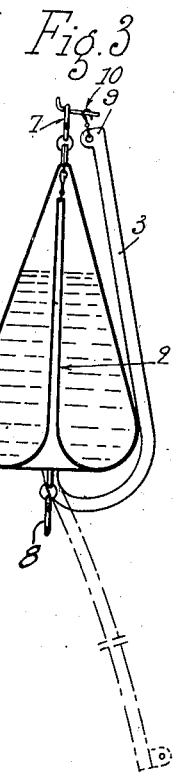
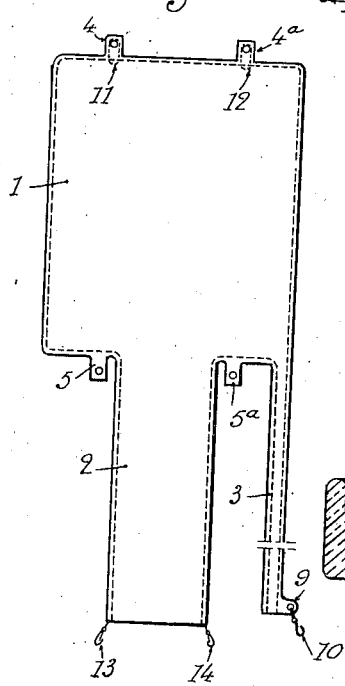
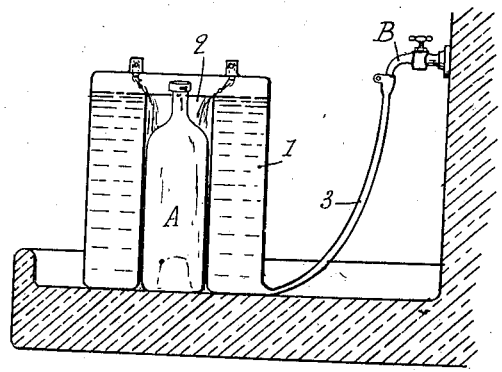
INVENTOR
PIERRE MICHEL EUGÈNE DESHAYES
BY
ATTORNEY Patented Oct. 21, 1941

2,260,008

UNITED STATES PATENT OFFICE 2,260,008

RECEPTACLE FOR TRANSPORTING AND DELIVERING LIQUIDS

Pierre Michel Eugène Deshayes, Paris, France, assignor to Jean Delattre Seguy, Chicago, Ill.

Application May 11, 1939, Serial No. 273,093
In France May 20, 1938

8 Claims. (Cl. 221—1)

The invention has for its object to provide a pliable receptacle of flexible material, of reduced weight and size when collapsed, which can be readily and cheaply manufactured and which is adapted to contain liquid out of presence of atmospheric air, although being deprived of rigid closure means; another object of the invention is to provide for ready distribution of the liquid in controllable amounts; a further object is to devise the receptacle in such manner that it may be easily turned inside out for facilitating inspection, repairs and cleaning. The invention also provides for the use of this improved receptacle as a heat exchanger for domestic purposes.

A preferred embodiment of the invention is illustrated in the drawing, wherein:

Fig. 1 is an elevation partly in section of my improved receptacle.

Figs. 2 and 3 are cross sections thereof, showing the receptacle respectively in the filling position and in the position for transport or delivery.

Fig. 4 is a plan view of the receptacle before the filling hose is turned inside, and Fig. 5 shows the use of the receptacle as a heat exchanger.

Referring to Fig. 4 the receptacle is made of two sheets of tight canvas, rubberized fabric or other impervious and flexible material, cut along the outline illustrated and secured together in a watertight manner along the edges, as shown by the dotted line, so as to provide a rectangular body, a smaller rectangular filling hose 2 integral therewith, and a discharge hose 3 opening into body 1, on the same side as filling hose 2.

The watertight connection of the two sheets may be made by cementing, sewing, vulcanizing the edges, or by any other conventional means.

4, 4ª—5, 5ª denote lugs for attaching flexible handles 7, 8 for carrying the receptacle, and 9 a lug for attaching a hook 10.

Each lug 4, 4ª also serves for securing a ring 11, 12, or any other attaching member, and the ends of filling hose 2 are provided with clips 13, 14 or any other complementary attaching members adapted to coact with members 11, 12.

In use, hose 2 is inturned within receptacle 1, as shown in Figs. 1 and 3, members 11, 12, 13 and 14 being attached together.

For filling the receptacle, the latter is placed in the position shown in Fig. 2, the opening provided by the filling hose, where the latter is connected with the receptacle body, facing upwardly. Liquid enters through said aperture and the filling hose into the receptacle.

The receptacle may be transported in the same position, it being carried by means of handle 8, or it may be transported in the inverted position shown in Fig. 3, when it is carried by means of handle 7. In this latter position, the liquid pressure causes the filling hose to collapse and close the receptacle after the manner of a valve; the weight of liquid would tend to draw filling hose 2 downwards, which is counteracted by the suspension of said hose through members 11, 12, 13 and 14.

When turning the receptacle upside down from the position of Fig. 2 to the position of Fig. 3, or when laying the receptacle on the ground, hose 2 acts as a check valve and prevents the waste of liquid, at least to an appreciable extent.

For storage purposes, hook 10 of discharge hose 3 should be hooked to handle 7 or to any other support at such a level as to prevent the liquid from flowing out. Hose 3 may alternatively be provided with a cock, for instance a pinchcock.

For distributing liquid, hook 10 is disengaged and the outlet of hose 3 is brought to a level below the liquid level in the receptacle. The outflow may be regulated by varying the head of liquid above the outlet or by pinching the flexible hose between the fingers.

It will be appreciated that this receptacle may be simply and cheaply manufactured. Due to the elimination of all rigid closure means, its weight and size, when collapsed, are quite small, thus offering important advantages when using the receptacle as water bucket for touring, hiking, camping, and the like, or as camping lavatory, the device being laid on the ground or suspended from a bough, etc. It may be turned inside out as a glove, thus facilitating cleaning, inspection and repairs; it being understood that the size of hose 2 should be such as to allow introducing the hand therethrough for connecting and disconnecting clips 13, 14 to and from rings 11, 12.

The same receptacle may be used as heat exchanger, for example for cooling bottles or the like. In this case, hose is threaded over the receptacle A (Fig. 5) containing a beverage to be cooled.

If it is desired to provide for a continuous circulation of cooling water, hose 3 may be connected to a water tap 3, and may be provided for this purpose with an elastic end portion, such as a rubber ring, the excess of cooling water flowing between hose 2 and receptacle A.

The invention is not limited to the embodiment above described. Thus, the receptacle may have a flat bottom so as to stand vertically when filled and laid on the ground, instead of lying flatwise.

If the receptacle should constantly be used in the position shown in Fig. 2, the filling hose, which operates as a check valve, might be arranged at the side opposite the discharge hose. In such case, it would not act as an overflow but it would still operate as a check valve and prevent waste of liquid when the receptacle is laid on the ground while keeping the liquid out of contact with the atmosphere, dust, insects, etc.

Having now described my invention what I claim as new and desire to secure by Letters Patent is:

1. A flexible receptacle for liquids having no rigid closure, comprising a receptacle body, a depending filling hose extending within said body and operating as a check valve and as an overflow, means for suspending the ends of said filling hose from the adjacent end of the receptacle and a discharge hose for the controllable distribution of the liquid.

2. A flexible receptacle for liquids having no rigid closure, comprising a receptacle body, a depending filling hose extending within said body and operating as a check valve and as an overflow, the transverse section of said hose being such as to allow introducing the hand therethrough, detachable means within said receptacle for suspending the ends of said filling hose from the adjacent end of the receptacle and a discharge hose for the controllable distribution of the liquid.

3. A flexible receptacle for liquids comprising a rectangular flat body, depending filling and discharge hoses opening into said body, two pairs of handle receiving lugs adjacent the opening of said filling hose into said body and at the opposite side of said body, respectively, attaching means within said body adjacent the last-named pair of lugs and coacting attaching means at the end of said filling hose.

4. A collapsible receptacle of flexible material for liquids comprising a main body expandable into substantially the form of a rectangular solid, and provided with a pair of hose-like projections extending integrally therefrom, one of said projections being relatively wider than the other and of a length substantially equal to the depth of said receptacle body and being invertable thereinto and operable as a filling hose and a check valve and as an overflow in the reverted liquid storage position of the receptacle, the relatively narrow hose-like projection being adapted to act as a discharge hose for the controllable distribution of the liquid, attaching means within said body opposite said wide hose and complementary attaching means at the end of said wide hose for retaining it in inverted position.

5. A collapsible receptacle of flexible material for liquids, comprising a main body having a large filling aperture, a flexible check valve extending within said body from said aperture to the opposite end of said body and opening from the outside toward the inside, a discharge hose for delivering liquid contained in said receptacle, and suspension means for keeping said flexible valve in operative position, said discharge hose opening into said receptacle adjacent said filling aperture.

6. A collapsible receptacle of flexible material for liquids comprising a main body, a hose extending within said body and adapted to operate as a filling hose in the filling position of said receptacle and as an overflow weir in the reverted liquid storage position thereof and a discharge hose operative in the last-named position.

7. A collapsible receptacle of flexible material for liquids comprising a main body having a filling aperture, an inner flange extending inwardly from said aperture and adapted to close said aperture in a substantially watertight manner under the pressure of the liquid stored in said receptacle, engagement means within said receptacle for keeping said flange substantially stretched, and a discharge hose opening into said receptacle.

8. A flexible receptacle for liquids having no rigid closure, comprising a receptacle body, an integral filling hose extending from said body and invertable thereinto and operable as a check valve in said inverted position, the said receptacle comprising attachment means therein cooperable with attachment means adjacent the free extremity of said filling hose to maintain it in longitudinally extended position and a discharge hose for the controllable distribution of the liquid.

PIERRE MICHEL EUGÈNE DESHAYES.